United States Patent
Gawade et al.

(10) Patent No.: US 9,272,647 B2
(45) Date of Patent: Mar. 1, 2016

(54) SEAT CLIMATE CONTROL SYSTEM

(71) Applicants: GM GLOBAL TECHNOLOGY OPERATIONS LLC, Detroit, MI (US); Dhama Innovations Private Limited, Hyderabad (IN)

(72) Inventors: Tushar Rajaram Gawade, Maharashtra (IN); Rao Mallikarjuna Chalasani, Bangalore (IN); Sankar Ayilam Swaminathan, Bangalore (IN); Vijaiya Shankar Ramakrishnan, Tamil Nadu (IN); Kranthi Kiran Vistakula, Hyderabad (IN); Prasenjit Kundu, Hyderabad (IN); Vivek Silwal, Hyderabad (IN)

(73) Assignees: GM Global Technology Operations LLC, Detroit, MI (US); Dhama Innovations Private Limited, Hyderabad (IN)

( * ) Notice: Subject to any disclaimer, the term of this patent is extended or adjusted under 35 U.S.C. 154(b) by 286 days.

(21) Appl. No.: 13/968,738

(22) Filed: Aug. 16, 2013

(65) Prior Publication Data

US 2015/0048658 A1    Feb. 19, 2015

(51) Int. Cl.
| | |
|---|---|
| *B60L 1/02* | (2006.01) |
| *H05B 1/00* | (2006.01) |
| *H05B 3/00* | (2006.01) |
| *H05B 11/00* | (2006.01) |
| *A47C 7/72* | (2006.01) |
| *A47C 31/00* | (2006.01) |
| *B60N 2/56* | (2006.01) |

(52) U.S. Cl.
CPC ............ *B60N 2/5678* (2013.01); *B60N 2/5642* (2013.01); *B60N 2/5692* (2013.01); *Y10T 29/49826* (2015.01)

(58) Field of Classification Search
CPC ... B60N 2/5642; B60N 2/5678; B60N 2/5692
USPC .............. 219/200, 201, 202, 212, 217, 443.1; 297/180.11–180.14
See application file for complete search history.

(56) References Cited

U.S. PATENT DOCUMENTS

| | | | | |
|---|---|---|---|---|
| 6,291,803 | B1* | 9/2001 | Fourrey | 219/497 |
| 6,541,737 | B1* | 4/2003 | Eksin et al. | 219/217 |
| 2006/0175877 | A1* | 8/2006 | Alionte et al. | 297/180.14 |
| 2009/0033130 | A1* | 2/2009 | Marquette et al. | 297/180.15 |
| 2010/0001558 | A1* | 1/2010 | Petrovski | 297/180.12 |
| 2011/0226751 | A1* | 9/2011 | Lazanja et al. | 219/217 |
| 2012/0198616 | A1* | 8/2012 | Makansi et al. | 5/423 |

* cited by examiner

*Primary Examiner* — Dana Ross
*Assistant Examiner* — Lindsey C Teaters
(74) *Attorney, Agent, or Firm* — Quinn Law Group, PLLC

(57) ABSTRACT

A seat climate control system includes a seat body having a first body surface and a second body surface opposite and spaced apart from the first body surface. The seat body defines an interior volume. The seat climate control system further includes at least one thermoelectric module at least partially disposed within the interior volume of the seat body. The thermoelectric module is configured to facilitate heat transfer upon receipt of electrical energy. The seat climate control system further includes at least one thermally conductive member disposed along the first body surface. The thermally conductive member is thermally coupled to the thermoelectric module. The thermally conductive member is configured to transfer heat between the thermoelectric module and a surface in contact with the thermally conductive member.

18 Claims, 4 Drawing Sheets

SEAT CLIMATE CONTROL SYSTEM

TECHNICAL FIELD

The present disclosure relates to seat climate control systems and methods for cooling and heating a vehicle seat.

BACKGROUND

Some vehicles include seat climate control systems for heating or cooling seats. Accordingly, seat climate control systems typically allow passengers to set their own personal comfort temperatures. Some seat climate control systems may include heat warmers to heat the seat or a ventilation unit to cool the seat.

SUMMARY

The present disclosure relates to seat climate control systems and methods. In an embodiment, the seat climate control system includes a seat body having a first body surface and a second body surface opposite and spaced apart from the first body surface. The seat body defines an interior volume. The seat climate control system further includes at least one thermoelectric module at least partially disposed within the interior volume of the seat body. The thermoelectric module is configured to facilitate heat transfer upon receipt of electrical energy. As used herein the, term "heat transfer" means the process in which thermal energy moves from one body or substance to another by radiation, conduction, convection, or a combination of these methods. The seat climate control system further includes at least one thermally conductive member disposed along the first body surface. The thermally conductive member is thermally coupled to the thermoelectric module. The thermally conductive member is configured to transfer heat between the thermoelectric module and a surface in contact with the thermally conductive member. The thermoelectric module may be a Peltier module. A Peltier module is a solid-state heat pump that can transfer heat from one side of the Peltier module to the other side, with consumption of electrical energy, depending on the direction of the current.

The seat body may be configured as a seat back. The seat body may be configured to be coupled to a vehicle seat. The seat body may define at least one fluid conduit configured to direct flow of gas. The seat climate control system may further include at least one heat sink configured to dissipate heat. The heat sink may be thermally coupled to the thermoelectric module. The seat climate control system may further include at least one fan. The fan is configured to move gas and is coupled to the heat sink. The fan may be positioned in the fluid conduit.

The present disclosure also relates to vehicles such as a car or a truck. In an embodiment, the vehicle includes a seat body. The seat body defines an inlet opening, at least one outlet opening, at least one fluid conduit establishing fluid communication between the inlet opening and the outlet opening. The seat body includes a first body surface and a second body surface opposite and spaced apart from the first body surface. The seat body defines an interior volume. The vehicle further includes a power source configured to supply electrical energy. The vehicle additionally includes at least one thermoelectric module electrically connected to the power source. The thermoelectric module is at least partially disposed within the interior volume of the seat body. The thermoelectric module is configured to facilitate heat transfer upon receipt of electrical energy from the power source. The vehicle further includes at least one thermally conductive plate exposed along the first body surface. The thermally conductive plate is thermally coupled to the thermoelectric module. The vehicle further includes at least one fan disposed in the fluid conduit. The fan is configured to direct flow of gas from the inlet opening to the outlet opening. The vehicle further includes at least one heat sink attached to the fan. The heat sink is configured to dissipate heat. The thermoelectric module is configured to transfer heat between a surface in contact with the thermally conductive plate and the thermoelectric module.

In the vehicle, the thermoelectric module may be a Peltier module. The seat body may include a third body surface and a fourth body surface opposite and spaced apart from the third body surface. The third body surface may be disposed between the first and second body surfaces. The outlet opening may be disposed along the third body surface and the fourth body surface. The seat body includes a fifth body surface and a sixth body surface opposite the fifth body surface. The fifth body surface may be disposed between the first body surface and the second body surface. The inlet opening is disposed at the sixth body surface. The first body surface, the second body surface, the third body surface, the fourth body surface, the fifth body surface, and the sixth body surface may define an entire outer perimeter of the seat body. The seat body may be shaped as a seat back. The vehicle includes a vehicle seat, and the seat body may not be an integral part of the vehicle seat. The seat body may be configured to be coupled to the vehicle seat. The vehicle may include another fan that is not attached to the heat sink.

The vehicle may further include a pressure switch disposed along the front body surface. The pressure switch is configured to detect pressure exerted against the front body surface. The pressure switch is electrically connected between the thermoelectric modules and the power source in order to establish an electrical connection between the power source and the thermoelectric modules when pressure is exerted against the front body surface. The seat body may be elongated along a seat axis. The fluid conduit may be a main conduit elongated along the device axis and in direct fluid communication with the inlet opening. The vehicle may further include branch conduits perpendicularly angled relative to the main conduit and disposed in fluid communication with the main conduit.

The present disclosure further relates to methods of manufacturing a seat climate control system. In an embodiment, the method includes the following steps: (1) determining a pressure distribution of a pressure exerted by a typical occupant on a body surface of a seat body when the occupant occupies the seat body in order to determine areas in the body surface where the highest amount of pressure is exerted by the occupant; (2) determining a thermal distribution of a heat transfer between the occupant and the seat body when the occupant occupies the seat body in order to determine areas in the body surface where the highest amount of heat transfer occurs between the occupant and the seat body; and (3) placing at least one thermally conductive element along the body surface in at least one of the areas wherein the highest amount of pressure is exerted by the occupant on the body surface and in at least one of the areas in the body surface where the highest amount of heat transfer occurs between the occupant and the seat body.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
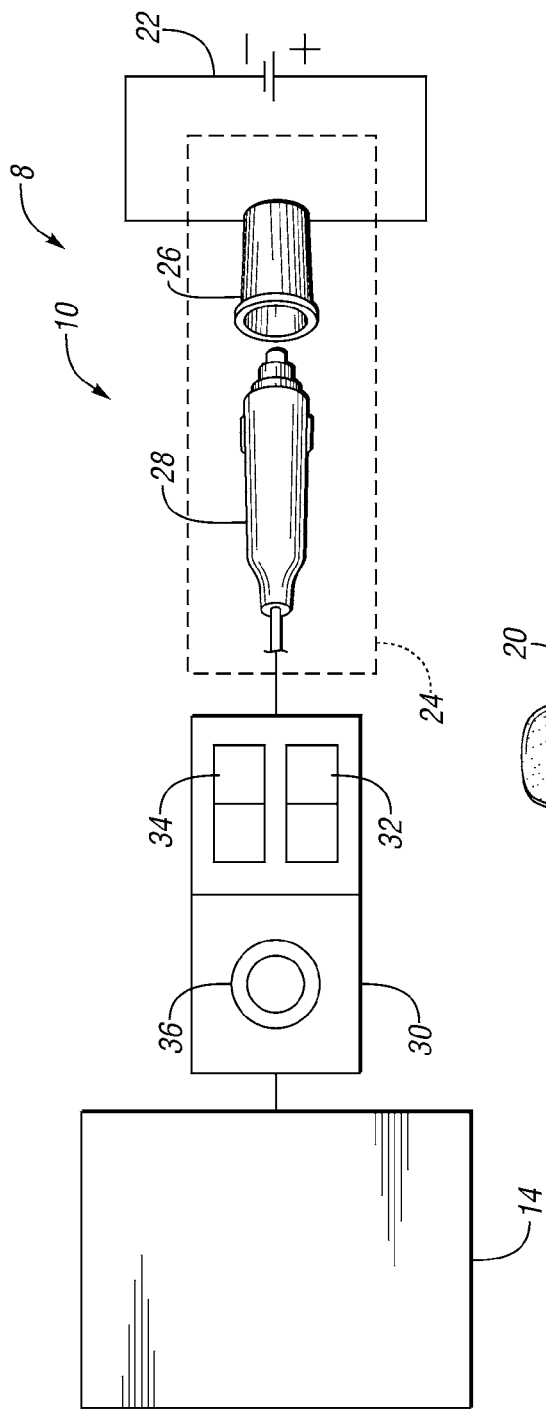
FIG. 1 is a schematic block diagram of a seat climate control system in accordance with an embodiment of the present disclosure, wherein the seat climate control system includes a power source, a control unit, an electrical connection assembly, and a seat climate control device.

Referring to the drawings, wherein like reference numbers correspond to like or similar components throughout the several figures, FIG. 1 schematically illustrates a climate control system 10 configured to cool or heat a vehicle seat 12 (FIG. 2) of a vehicle 8. Accordingly, the system 10 may be referred to as a seat climate control system and may be part of the vehicle 8. However, the system 10 may be also configured for cooling or heating different components of the vehicle 8. For example, the system 10 can be used to heat or cool other vehicle parts such as the steering wheel, gear shift knob, arm rest, neck rest pillow, among others. Although the system 10 is suited for vehicular applications, it is contemplated that the system 10 can be used in other applications such as therapeutic applications. An exemplary therapeutic application entails heating or cooling a portion of a human body to improve blood circulation.

Figure 2:
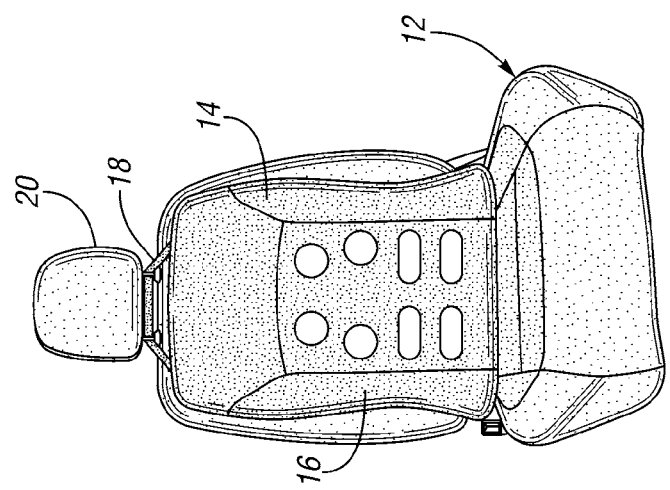
FIG. 2 is a schematic perspective view of a seat climate control device of FIG. 1 coupled to a vehicle seat.

With reference to FIGS. 1 and 2, the system 10 includes a climate control device 14 configured to cool or heat a body such as a human body. The climate control device 14 may be portable or integrally formed with the seat 12. In the embodiment depicted in FIG. 2, the climate control device 14 is generally shaped as a seat back and can be coupled to the seat 12. For instance, the climate control device 14 may include a device or seat body 16 and an elastic strap 18 attached to the device body 16. During assembly, the elastic strap 18 may be positioned partially around the headrest 20 of the seat 12 to couple the portable climate control device 14 to the seat 12. The device body 16 may be substantially shaped as a seat back, a seat bottom or cushion, or another part of the seat 12 and may therefore be referred to as a seat body. As discussed above, the device body 16 may be the body of the seat 12 and is thus integrally formed with the seat 12. Alternatively, the device body 16 may not be an integral part of the vehicle seat 12. Regardless, the device body 16 may be referred to as the seat body.

With specific reference to FIG. 1, the climate control device 14 is electrically connected to a power source 22 such as a DC power source. The power source 22 may be an energy storage device (ESD) such as a 12-volt auxiliary battery suitable for powering the climate control device 14. The power source 22 may part of the vehicle 12 or the system 10 and can supply electrical power to the climate control device 14.

An electrical connection assembly 24 electrically connects the climate control device 14 to the power source 22. The electrical connection assembly 24 may be a DC power connector and may include a socket 26 electrically connected to the power source 22 and a plug 28, such as a car adapter, electrically connected to the climate control device 14. The electrical connection assembly 24 may be connected to an AC power supply using a suitable AC to DC convertor/adapter. The plug 28 is configured to mate with the socket 26 in order to establish an electrical connection between the power source 22 and the climate control device 14. The system 10 may be powered by a waveform that switches off the climate control device 14 for twenty seconds after every four minutes for cognitive cooling. The waveform may be preprogrammed such that the system 10 can change its mode of operation from heating to cooling and from cooling to heating for therapeutic benefit.

With continued reference to FIGS. 1 and 2, the system 10 further includes a control module or interface 30 for controlling the climate control device 14. The control module 30 may include circuitry, a processor, memory, and program instructions stored on the memory. The control module 30 is electrically connected between the climate control device 14 and the power source 22 and may include an on/off switch, button, or touch sensor 32 to establish or break an electrical connection between the power source 22 and the climate control device 14. In addition to the on/off switch 32, the control module 30 includes a mode switch, button, or touch sensor 34 for selecting the mode of operation of the climate control device 14. The control module 30 may be embedded in the heating, ventilation, and air conditioning (HVAC) control system of the vehicle 8, or a separate mode switch or button 34 may be installed in the instrument panel of the vehicle 8. In other words, the control module 30 may be integrated with the HVAC control system of the vehicle 8. Alternatively, the control module 30 may be independent of the HVAC control system of the vehicle 8. The climate control device 14 can be operated in a cooling mode or a heating mode. In the cooling mode, the climate control device 14 cools a body, such as a human body, in direct contact with the climate control device 14, whereas in the heating mode, the climate control device 14 warms a body, such as a human body, in contact with the climate control device 14. The climate control device 14 may switch between the cooling and heating modes by changing the polarity of the voltage applied by the power source 22. Thus, actuating the mode switch or button 34 changes the polarity of the voltage applied to the climate control device 14. In addition to the cooling and heating modes, the system 10 may include a cycling mode, in which the climate control device 14 cycles between the cooling mode and the heating mode at set time intervals. The mode switch 34 may be used to select the cycling mode. In the cycling mode, the heating/cooling cycle time may vary. For example, in the cycling mode, the climate control device 14 may operate in the cooling mode for four minutes and in the heating mode for 2 minutes in therapeutic applications. Regardless of its operating mode, after a predetermine period of time (e.g., 3 minutes), the climate control system 10 can automatically be turned off for a few seconds (e.g., 5 seconds) to allow the device 14 to cool off or warm up. The control module 30 may include a temperature regulator 36 for controlling the temperature of the climate control device 14 in either the cooling mode or the heating mode. The temperature regulator 36 may be configured as a knob.

Figure 5:
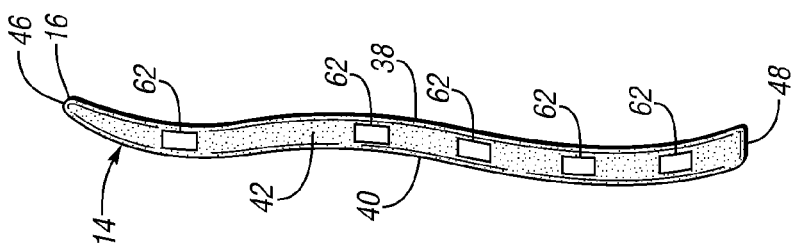
FIG. 5 is a schematic side view of the seat climate control device shown in FIG. 2.
Figure 4:
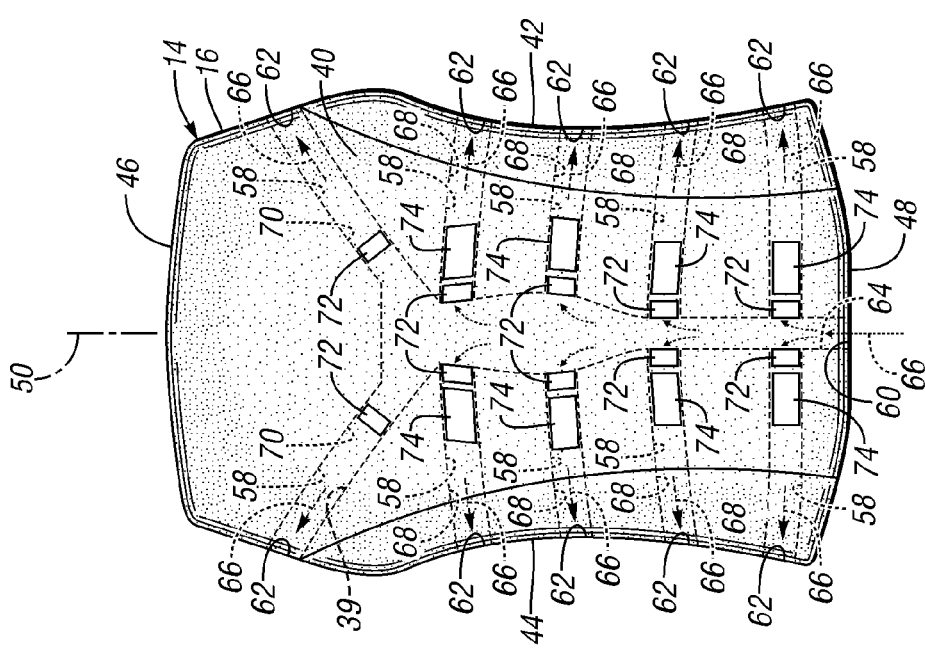
FIG. 4 is a schematic rear view of the seat climate control device shown in FIG. 2.
Figure 3:
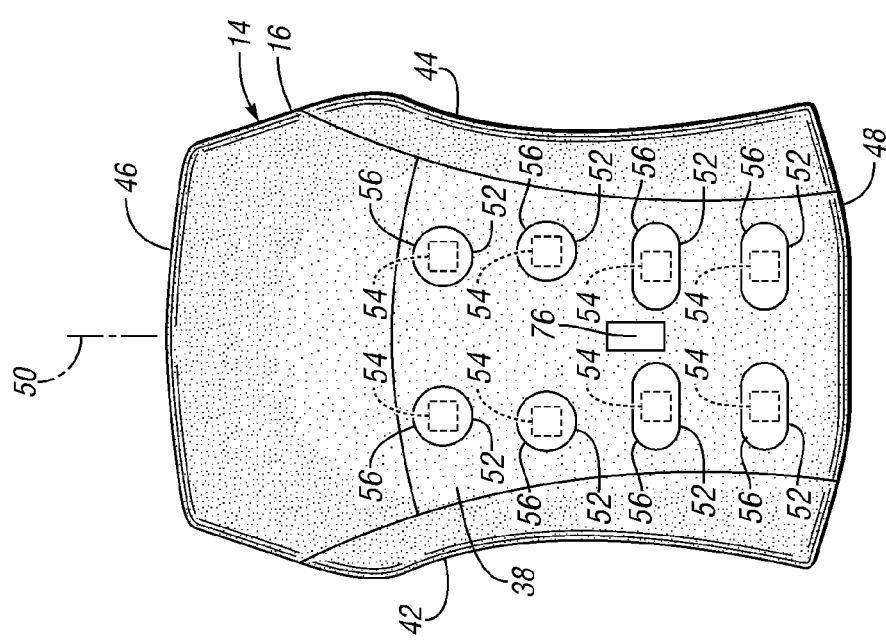
FIG. 3 is a schematic front view of the seat climate control device shown in FIG. 2.

With reference to FIGS. 3-5, the climate control device 14 may be generally shaped as a seat back and includes the device or seat body 16. The device body 16 may be formed by one or more plastic sheets and one or more pieces of fabric covering the plastic sheets. This fabric may be a sweat absorbing fabric. If the climate control device 14 is not part of the vehicle seat 12, the thickness of the device body 16 can be minimized to enhance the occupant's comfort. The surface texture and color of the fabric may vary. Furthermore, the device body 16 may be elongated along a device or seat axis 50 and includes a first or front body surface 38 and a second or rear body surface 40 opposite and spaced apart from the first body surface 38. The device body 16 defines an interior volume 39. The first body surface 38 may be contoured to receive an occupant's back, whereas the second body surface 40 may be shaped to be received in the back of the seat 12. The device body 16 further includes a third body surface 42 (or first side surface) and a fourth body surface 44 (or second side surface) opposite the third body surface 42. The third body surface 42 and the fourth body surface 44 each extend between the first body surface 38 and the second body surface 40. For example, each of the third body surface 42 and the fourth body surface 44 may extend from the first body surface 38 to the second body surface 40.

The device body 16 further includes a fifth or top body surface 46 and a sixth or bottom body surface 48 opposite the fifth body surface 46. Each of the fifth body surface 46 and the sixth body surface 48 extends between the first body surface 38 and the second body surface 40. For instance, the fifth body surface 46 and the sixth body surface 48 may each extend from the first body surface 38 to the second body surface 40. The first body surface 38, the second body surface 40, the third body surface 42, the fourth body surface 44, the fifth body surface 46, and the sixth body surface 48 may entirely or partially define the outer perimeter of the device body 16. Thus, the first body surface 38, the second body surface 40, the third body surface 42, the fourth body surface 44, the fifth body surface 46, and the sixth body surface 48 may define the entire outer perimeter of the device body 16.

In addition to the device body 16, the climate control device 14 includes one or more thermoelectric modules 54 and one or more thermally conductive members 52 thermally connected to the thermoelectric modules 54. The thermoelectric modules 54 may be Peltier junctions or modules (as described in detail below) and can be wholly or partly disposed inside the device body 16. In operation, the thermoelectric modules 54 can transfer heat from or to the thermally conductive members 52 upon receipt of DC voltage from the power source 22 (FIG. 1), thereby cooling or heating the thermally conductive members 52. The number of thermoelectric modules 54 may correspond to the number of thermally conductive members 52. For example, the climate control device 14 may include eight thermoelectric modules 54. It is nevertheless envisioned that the climate control device 14 may include more or fewer thermoelectric modules 54. The shape, size, and specification of the thermoelectric modules 54 and thermally conductive members 52 may also vary. For example, the surface area of the thermoelectric modules 54 may range between 9 and 50000 square millimeters. The thermoelectric modules 54 may be at least partially disposed within the interior volume 39. Each thermoelectric module 54 is configured to facilitate heat transfer upon receipt of electrical energy. As used herein, the term "heat transfer" means the process in which thermal energy moves from one body or substance to another by radiation, conduction, convection, or a combination of these methods.

The climate control device 14 may additionally include a pressure switch or sensor 76 capable of detecting the presence of an occupant leaning against the device body 16. The pressure switch 76 is electrically connected to the thermoelectric modules 54 and can turn the climate control device 14 on or off when the occupant's presence is detected. For example, the system 10 can be turned ON as an occupant sits on or leans against the climate control device 14. Then, the system 10 may be turned OFF after some time has passed since the occupant gets up (i.e., does not sit or lean against the climate control device 14), but the system 10 can be instantly turned ON as the occupant sits on or leans against the climate control device 14 again. The pressure switch 76 may be disposed along or adjacent the first body surface 38 and can send a signal to the control module 30. Hence, the power switch or sensor 76 may be electrically connected to the control module 30. Upon receipt of the signal from the power switch or sensor 76, the control module 30 can cut off power to the thermoelectric modules 54. Alternatively, the pressure switch 76 can establish or break an electrical connection between the power source 22 and the thermoelectric modules 54 when the occupant exerts pressure on at least a portion of the front body surface 38 of the device body 16. The pressure switch 76 may therefore be electrically connected between the power source 22 and the thermoelectric modules 54.

The thermally conductive members 52 may be exposed at the first body surface 38 in order to transfer heat from or to a surface (e.g., a surface of a seat occupant's body) via heat conduction (as opposed to convention). Specifically, when an occupant sits on the seat 12 and thereby positions a part of his/her body in contact with the thermally conductive members 52, the thermally conductive members 52 can transfer heat from or to the occupant's body, thereby cooling or heating the occupant's body via heat conduction. It is desirable to transfer heat to or from the occupant's body via heat conduction because heat transfer using heat conduction can be faster than heat transfer using convention. It is also desirable to produce a cost-effective and lightweight system capable of providing instantaneous thermal comfort to an occupant of the seat 12 during extreme weather conditions. To this end, the climate control system 10 can consume only forty Watts and may weigh less than one kilogram.

The climate control device 14 may include eight thermally conductive members 52 arranged symmetrically along the first body surface 38 of the device body 16. It is envisioned, however, that the climate control device 14 may include more or fewer thermally conductive members 52. Regardless of the specific number, thermally conductive members 52 may each be partly or entirely made of a thermally conductive material capable of efficiently transferring heat between an occupant's body and the thermoelectric modules 54. For instance, the thermally conductive members 52 may be wholly or partly made of a metallic material such as aluminum. One or more of the thermally conductive members 52 may be configured as thermally conductive plates 56. Alternatively, the thermally conductive members 52 may be configured as a thin thermally conductive layer. The thermally conductive members 52 may be substantially flat or contoured to match the occupant's body shape.

With continued reference to FIGS. 3-5, in the depicted embodiment, some thermally conductive members 52 may have a substantially circular shape while others may have a substantially elliptical shape. The elliptical thermally conductive members 52 may be disposed closer to the sixth body surface 48 than the circular thermally conductive members 52. However, the shape, arrangement, and orientation of the thermally conductive members 52 may vary and may be determined based on a thermal and pressure distribution study of the climate control device 14 when an occupant sits on or leans against the climate control device 14 as discussed below. The thermally conductive members 52 may be arranged in one or more linear rows parallel to the device axis 50. For example, four thermally conductive members 52 may be arranged along a linear row on one side of the device axis 50, while another linear row of four thermally conductive members 52 are disposed on the opposite side of the device axis 50. One or more of the thermally conductive members 52 may be a liquid filled pouch collectively cooled by the thermoelectric module 54. The surface area of the thermally conductive members 52 may vary and also be determined based on the thermal and pressure distribution study mentioned above. For example, the surface area of the thermally conductive members 52 may range between 25 and 200000 square millimeters. It is also contemplated that the surface texture and color of the thermally conductive members 52 may vary.

Each thermally conductive member 52 may be thermally coupled to one or more thermoelectric module 54. For example, one thermally conductive member 52 may be mounted on one thermoelectric module 54 to enhance heat distribution. Briefly, the thermoelectric modules 54 can transfer heat from one of its side to the other when it is subjected to electrical energy. The direction of the electrical current may be changed in order to heat or cool the thermally conductive member 52 coupled to the thermoelectric module 54. The structure and operation of the thermoelectric modules 54 are described in detail below.

With specific reference to FIGS. 4 and 5, the climate control device 14 defines at least one inlet or first opening 60, one or more outlet or second openings 62 (e.g. vents), and one or more fluid conduits 58 configured, shaped, and sized to direct gas flow (e.g., airflow) between the inlet opening 60 and the outlet openings 62. The fluid conduits 58 can be configured as channels and fluidly couple the inlet opening 60 and the outlet openings 62, thereby allowing a fluid, such as air, to flow between the inlet opening 60 and the outlet openings 62. For example, the fluid conduits 58 can be partly or wholly defined within the device body 16. As a non-limiting example, the cross-sectional area of the fluid conduits 58 may range between 500 and 12000 square millimeters. In the depicted embodiment, the inlet opening 60 may extend through the sixth body surface 48 and allows gases 66, such as ambient air, to enter the fluid conduits 58. It is nevertheless contemplated that the inlet opening 60 may be disposed at other locations of the device body 16.

The outlet openings 62 may extend through the third body surface 42, the fourth body surface 44, or both. However, it is envisioned that the outlet openings 62 may be at other locations of the device body 16. Irrespective of their location, the outlet openings 62 allow gases 66 flowing through the fluid conduits 58 to exit the climate control device 14.

The fluid conduits 58 extend through the device body 16 and may include a main or central conduit 64 elongated along the device or seat axis 50 and disposed in direct fluid communication with the inlet opening 60. Aside from the main conduit 64, the fluid conduits 58 include first branch conduits 68 and second branch conduits 70. The first branch conduits 68 may be elongated in a direction substantially perpendicular to the main conduit 64, while the second branch conduits 70 may be elongated at an oblique angle relative to the main conduit 64. The second branch conduits 70 may be closer to the fifth body surface 46 than the first branch conduits 68. The first and second branch conduits 68, 70 may be disposed in direct fluid communication with the outlet openings 62. The gas flow path through the fluid conduits 58 can be optimized to minimize gas flow resistance.

The climate control device 14 further includes a plurality of fans 72 disposed in fluid communication with the fluid conduits 58. The fans 72 are configured to force the flow of gases 66 from the inlet opening 60 toward the outlet openings 62. To this end, the fans 72 may be disposed in each of the first branch conduits 68 at a location adjacent the main conduit 64. The fans 72 may also be located along the second branch conduits 70 to enhance gas circulation through fluid conduits 58. During operation, the fans 72 may be turned off when the climate control system 10 operates in the heating mode. When the climate control system 10 operates in the cooling mode, the fans 72 may be turned on to dissipate the occupants' body heat. Noise and vibration can be dampened by physically isolating the fans 72 from the surfaces defining the fluid conduits 58 or any other appropriate surfaces of the climate control device 14. Instead of fans 72, the climate control device 14 may include blowers or any other pump or device capable of forcing the gases 66 toward the outlet openings 62. Thus, the reference number 72 may alternatively represent a blower or any suitable air pump.

In addition to the fans 72, the climate control device 14 includes a plurality of heat sinks 74 configured to dissipate heat. The heat sinks 74 can be attached to the back of each thermoelectric module 54. Moreover, the heat sinks 74 are thermally coupled to each thermoelectric module 54 and may be configured as conventional radiators including a plurality of fins. Nonetheless, the type, shape, size, and material of the heat sinks 74 may vary. For example, the surface area of the heat sinks 74 may range between 50 and 200000 square millimeters. In the depicted embodiment, the heat sinks 74 are directly connected to some fans 72 and are therefore configured to cool the gases 66 forced out of the fans 72. The heat sinks 74 may be located, for example, in all the first branch conduits 68 but not in the second branch conduits 70. Thus, not all the fans 72 are attached to heat sinks 74. However, it is contemplated that heat sinks 74 may also be located in the second branch conduits 70. The heat sinks 74 and the fans 72 may be collectively replaced by any other heat transferring device (e.g., heat pipe) suitable for transferring and rejecting heat. The fluid conduits 58 are configured, shaped, and sized to direct gas flow (e.g., airflow) between the inlet opening 60 and the outlet openings 62 in order to facilitate heat transfer from the heat sinks 74 to the vehicle interior compartment (not shown). As a non-limiting example, the gas flow rate within the fluid conduits 58 used for heat dissipation may range between 0.5 and 50 cubic feet per minute.

Figure 7:
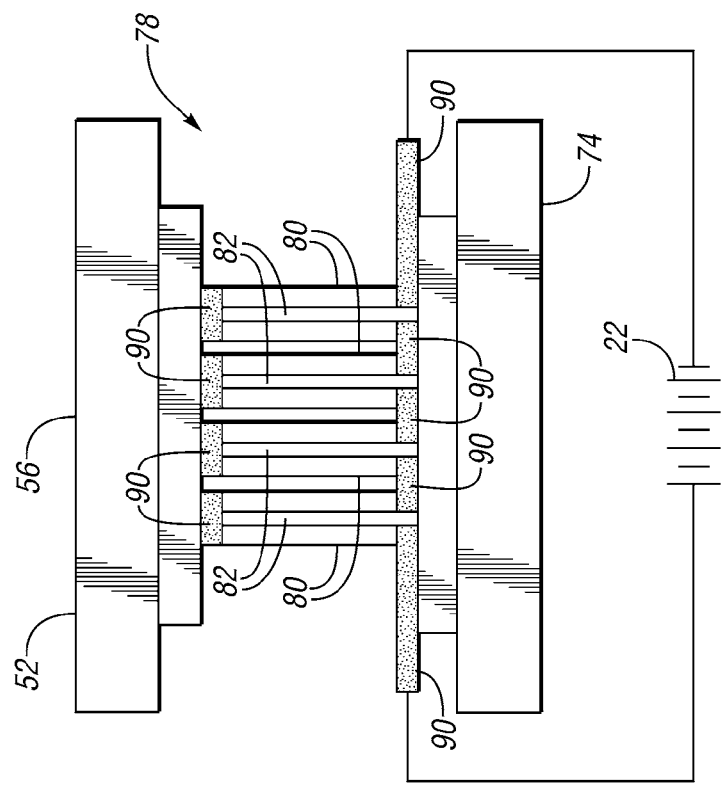
FIG. 7 is a schematic side view of the Peltier module shown in FIG. 6, depicting the semiconductor elements electrically connected in series.
Figure 6:
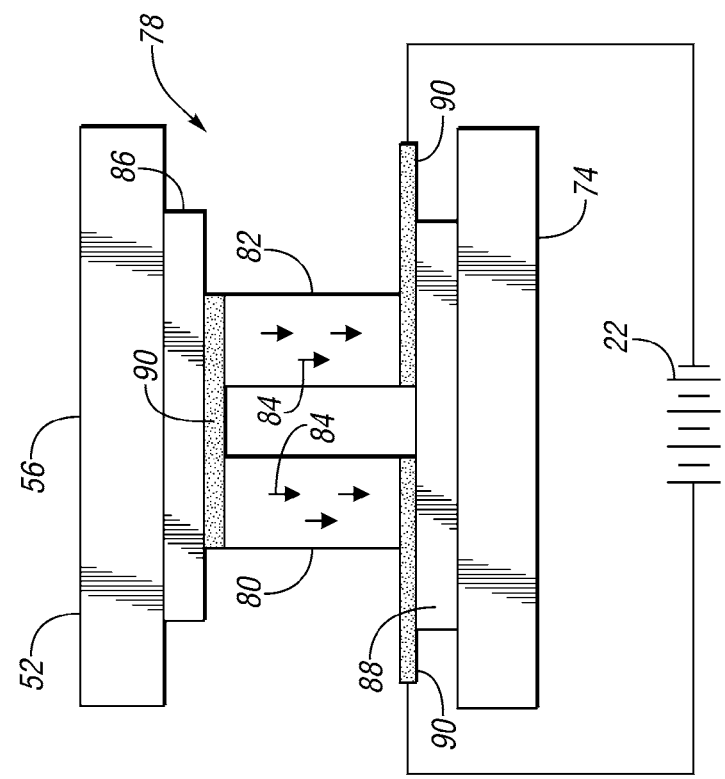
FIG. 6 is a schematic front view of a Peltier module of the seat climate control device depicted in FIG. 2, showing semiconductor elements thermally connected in parallel.

With reference to FIGS. 6 and 7, the thermoelectric modules 54 may be Peltier junctions or modules 78 employing the Peltier effect to create a heat flux 84 between the junction of two different types of materials. Thus, the Peltier modules 78 can transfer heat by applying a DC voltage to the sides of a semiconductor to create a temperature differential. In the depicted embodiment, the Peltier module 78 is a solid-state heat pump that can transfer heat from one side of the Peltier module 78 to the other, with consumption of electrical energy, depending on the direction of the current. The operation of the Peltier module 78 can thus be changed between cooling and heating by changing the direction of the electric current. In summary, the thermoelectric modules 54 (e.g., Peltier modules 78) can transfer heat upon receipt of electrical energy.

The Peltier junctions or modules 78 may include a plurality of n-type semiconductor elements 80 and p-type semiconductor elements 82 electrically connected in series (FIG. 7) but thermally connected in parallel (FIG. 6). The n-type semiconductor elements 80 may be configured as pellets and may be wholly or partly made of n-type Bismuth Telluride or any other suitable semiconductor. The p-type semiconductor elements 82 may be configured as pellets and may be wholly or partly made of p-type Bismuth Telluride or any other suitable semiconductor.

The Peltier module 78 includes a first substrate 86 and a second substrate 88 both made of a material that is an electrical insulator but a good heat conduct. For example, the first and second substrates 86, 88 may be wholly or partly made of ceramic. The n-type semiconductor elements 80 and p-type semiconductor elements 82 are disposed between the first and second substrates 86, 88. The second substrate 88 may be directly connected or mounted on one or more heat sinks 74, while the first substrate 86 may be directly connected or mounted to one or more thermally conductive members 52. A plurality of electrical carriers 90 are mechanically coupled between the second substrate 88 and the n-type semiconductor elements 80 and p-type semiconductor elements 82. These electrical carriers 90 are electrically connected to the power source 22. Another set of electrical carriers 90 is mechanically coupled between the first substrate 86 and the n-type semiconductor elements 80 and p-type semiconductor elements 82. All the electrical carriers 90 are wholly or partly made of an electrically conductive material, such as a metal, and may be configured as electrically conductive tabs.

When DC voltage is applied to the Peltier module 78, the n-type semiconductor elements 80 and p-type semiconductor elements 82 absorb heat energy from the first substrate 86 and release it to the second substrate 88 at the opposite side of the Peltier module 78 (see heat flux 84). The first substrate 86 thus becomes cold, and the second substrate 88 becomes hot. Because the first substrate 86 is thermally coupled to the thermally conductive member 52, the thermally conductive member 52 becomes cold when the first substrate 86 becomes cold. Reversing the polarity of the electrical current will result in reversed hot and cold sides. Thus, the thermally conductive member 52 can become hot when the first substrate 86 becomes hot. Because the thermally conductive members 52 can be in direct contact with an occupant's body, the heat may be transferred between the occupant's body and the thermally conductive members 52. In summary, the thermally conductive members 52 are configured to transfer heat between the thermoelectric modules 54 and a surface (e.g., human body surface) in direct contact with the thermally conductive members 52.

Figure 8:
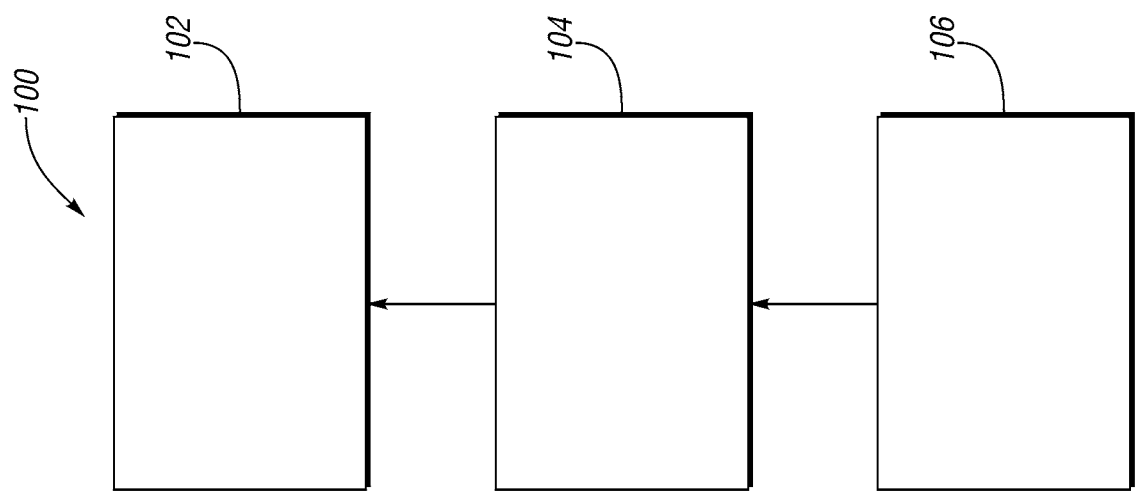
FIG. 8 is a flowchart of a method for manufacturing a seat climate control system in accordance with an embodiment of the present disclosure.

FIG. 8 is a flowchart illustrating a method 100 of manufacturing the climate control system 10. In block 102, the method 100 includes determining a pressure distribution of a pressure exerted by a typical occupant's body on the first body surface 38 of the device body 16 when the occupant is in contact with the device body 16 by, for example, leaning his/her back against the device body 16. The typical occupant may be a male human that weighs 180 pounds and 5 feet and 8 inches tall. By performing the pressure distribution study, the high pressure areas of the device body 16 may be determined. As used herein, the high pressure areas refer to areas of the first body surface 38 where the occupant would exert the most pressure if the occupant uses the device body 16 for its intended purpose. For instance, if the device body 16 is configured as a seat back, the high pressure areas are the areas in the front body surface 38 where the occupant exerts the most pressure when his/her back leans against the device body 16. In block 104, the method 100 includes determining the thermal distribution of a temperature transfer from the occupant to the device body 16 when the occupant is in contact with the device body 16, by for example, leaning his/her back against the device body 16. By performing the thermal distribution study, the high temperature areas may be determined. As used herein, the high temperature areas refer to the areas of the first body surface 38 where most heat is transferred between the occupant's body and the device body 16 if the device body 16 is used for its intended purpose. For instance, if the device body 16 is configured as a seat back, the high temperature areas are the areas in the front body surface 38 where the occupant's body transfers the most amount of heat to the device body 16 when his/her back leans against the device body 16. In block 106, the method 100 further includes manufacturing the climate control device 14 as described above such that the thermally conductive members 52, the thermoelectric modules 54, or both are positioned in the high temperature areas and the high pressure areas of the front body surface 38. The thermally conductive members 52 may be sized to cover the high temperature areas, the high pressure areas, or both. Thus, the surface area of the thermally conductive members 52 may be based on the thermal distribution study, the pressure distribution study, or combination thereof.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A seat climate control system, comprising:
   a seat body defining an inlet opening, at least one outlet opening, and at least one fluid conduit establishing fluid communication between the inlet opening and the at least one outlet opening, the seat body including a first body surface and a second body surface opposite and spaced apart from the first body surface, wherein the seat body defines an interior volume;
   at least one thermoelectric module at least partially disposed within the interior volume, the at least one thermoelectric module being configured to facilitate heat transfer upon receipt of electrical energy;
   at least one thermally conductive member disposed along the first body surface, the at least one thermally conductive member being thermally coupled to the at least one thermoelectric module;
   at least one fan disposed in the at least one fluid conduit, the at least one fan being configured to direct flow of gas from the inlet opening to the at least one outlet opening; and
   wherein the at least one thermally conductive member is configured to transfer heat between the at least one thermoelectric module and a surface in direct contact with the at least one thermally conductive member.

2. The seat climate control system of claim 1, wherein the at least one thermoelectric module is a Peltier module.

3. The seat climate control system of claim 1, wherein the seat body is configured as a seat back.

4. The seat climate control system of claim 1, wherein the seat body is configured to be coupled to a vehicle seat.

5. The seat climate control system of claim 1, further comprising at least one heat sink configured to dissipate heat, the at least one heat sink being thermally coupled to the at least one thermoelectric module.

6. The seat climate control system of claim 5, wherein the at least one fan is coupled to the at least one heat sink.

7. A vehicle, comprising:
a seat body defining an inlet opening, at least one outlet opening, at least one fluid conduit establishing fluid communication between the inlet opening and the at least one outlet opening, the seat body including a first body surface and a second body surface opposite and spaced apart from the first body surface, wherein the seat body defines an interior volume;
a power source configured to supply electrical energy;
at least one thermoelectric module electrically connected to the power source, the at least one thermoelectric module being at least partially disposed within the interior volume, the at least one thermoelectric module being configured to facilitate heat transfer upon receipt of electrical energy from the power source;
at least one thermally conductive plate exposed along the first body surface, the at least one thermally conductive plate being thermally coupled to the at least one thermoelectric module;
at least one fan disposed in the at least one fluid conduit, the at least one fan being configured to direct flow of gas from the inlet opening to the at least one outlet opening;
at least one heat sink attached to the at least one fan, the at least one heat sink being configured to dissipate heat; and
wherein the at least one thermoelectric module is configured to transfer heat between a surface in contact with the at least one thermally conductive plate and the at least one thermoelectric module.

8. The vehicle of claim 7, wherein the at least one thermoelectric module is a Peltier module.

9. The vehicle of claim 7, wherein the seat body includes a third body surface and a fourth body surface opposite and spaced apart from the third body surface, the third body surface being disposed between the first and second body surfaces, and the at least one outlet opening is disposed along the third body surface and the fourth body surface.

10. The vehicle of claim 9, wherein the seat body includes a fifth body surface and a sixth body surface opposite and spaced apart from the fifth body surface, the fifth body surface being disposed between the first body surface and the second body surface, and the inlet opening being disposed at the sixth body surface.

11. The vehicle of claim 10, wherein the first body surface, the second body surface, the third body surface, the fourth body surface, the fifth body surface, and the sixth body surface define an entire outer perimeter of the seat body.

12. The vehicle of claim 11, wherein the seat body is shaped as a seat back.

13. The vehicle of claim 12, wherein the vehicle includes a vehicle seat, and the seat body is not an integral part of the vehicle seat.

14. The vehicle of claim 13, wherein the seat body is configured to be coupled to the vehicle seat.

15. The vehicle of claim 7, wherein the at least one fan is a first fan, and the vehicle further comprises a second fan that is not attached to the at least one heat sink.

16. The vehicle of claim 7, further comprising a pressure switch disposed along the front body surface and being configured to detect pressure exerted against the front body surface, the pressure switch being electrically connected between the at least one thermoelectric module and the power source in order to establish an electrical connection between the power source and the at least one thermoelectric module when pressure is exerted against the front body surface.

17. The vehicle of claim 7, wherein the seat body is elongated along a seat axis, and the at least one fluid conduit includes is a main conduit elongated along the seat axis, the main conduit being in direct fluid communication with the inlet opening.

18. The vehicle of claim 17, further comprising a plurality of branch conduits perpendicularly angled relative to the main conduit, each of the branch conduits being disposed in fluid communication with the main conduit.

* * * * *